(12) United States Patent
Mogamiya et al.

(10) Patent No.: US 7,508,441 B1
(45) Date of Patent: Mar. 24, 2009

(54) ELECTRONIC STILL CAMERA AND IMAGE PICK-UP UNIT

(75) Inventors: Makoto Mogamiya, Tokyo (JP); Teruo Sakai, Saitama (JP)

(73) Assignee: Hoya Corporation, Tokyo (JP)

( * ) Notice: Subject to any disclaimer, the term of this patent is extended or adjusted under 35 U.S.C. 154(b) by 810 days.

(21) Appl. No.: 10/670,218

(22) Filed: Sep. 26, 2003

(30) Foreign Application Priority Data

Sep. 27, 2002 (JP) .............................. 2002-282291

(51) Int. Cl.
G02B 13/16 (2006.01)
G02B 9/00 (2006.01)
H04N 5/225 (2006.01)

(52) U.S. Cl. ..................... 348/335; 348/340; 359/796

(58) Field of Classification Search ................. 348/340, 348/335; 359/793–796, 642–840; 396/456
See application file for complete search history.

(56) References Cited

U.S. PATENT DOCUMENTS

| 5,870,638 | A | 2/1999 | Kurosawa | |
|---|---|---|---|---|
| 6,374,060 | B1 | 4/2002 | Mogamiya | |
| 6,700,617 | B1 * | 3/2004 | Hamamura et al. | 348/351 |
| 6,829,011 | B1 * | 12/2004 | Higuchi et al. | 348/340 |
| 7,019,780 | B1 * | 3/2006 | Takeuchi et al. | 348/340 |
| 7,084,920 | B2 * | 8/2006 | Kobayashi | 348/333.09 |
| 7,295,387 | B1 * | 11/2007 | Ohmori et al. | 359/796 |
| 7,391,457 | B2 * | 6/2008 | Fujimoto et al. | 348/340 |
| 2003/0043289 | A1 * | 3/2003 | Konno | 348/335 |
| 2003/0103157 | A1 * | 6/2003 | Watanabe et al. | 348/360 |

FOREIGN PATENT DOCUMENTS

| JP | 8-181298 | 7/1996 |
|---|---|---|
| JP | 8-191418 A | 7/1996 |
| JP | 2000-101886 A | 4/2000 |
| JP | 2000-101887 | 4/2000 |
| JP | 2000-162668 A | 6/2000 |
| JP | 2000-324370 | 11/2000 |

OTHER PUBLICATIONS

English language Abstract of JP 2000-101886 A.
English language Abstract of JP 2000-162668 A.
English language Abstract of JP 8-191418 A.

* cited by examiner

*Primary Examiner*—David L Ometz
*Assistant Examiner*—Pritham Prabhakher
(74) *Attorney, Agent, or Firm*—Greenblum & Bernstein, P.L.C.

(57) ABSTRACT

An electronic still camera includes a photographing optical system, an image pick-up device, and a transmission optical component. Light rays of an object which are passed through the photographing optical system are incident on the image pick-up device through the transmission optical component. The transmission optical component is shaped so as to shift an image point of an object image formed through the photographing optical system rearwards.

4 Claims, 7 Drawing Sheets

PRIOR ART

ELECTRONIC STILL CAMERA AND IMAGE PICK-UP UNIT

BACKGROUND OF THE INVENTION

1. Field of the Invention

The present invention relates to an electronic still camera such as an SLR electronic still camera incorporating a focal plane shutter and an image pick-up unit.

2. Description of the Related Art

Figure 11:
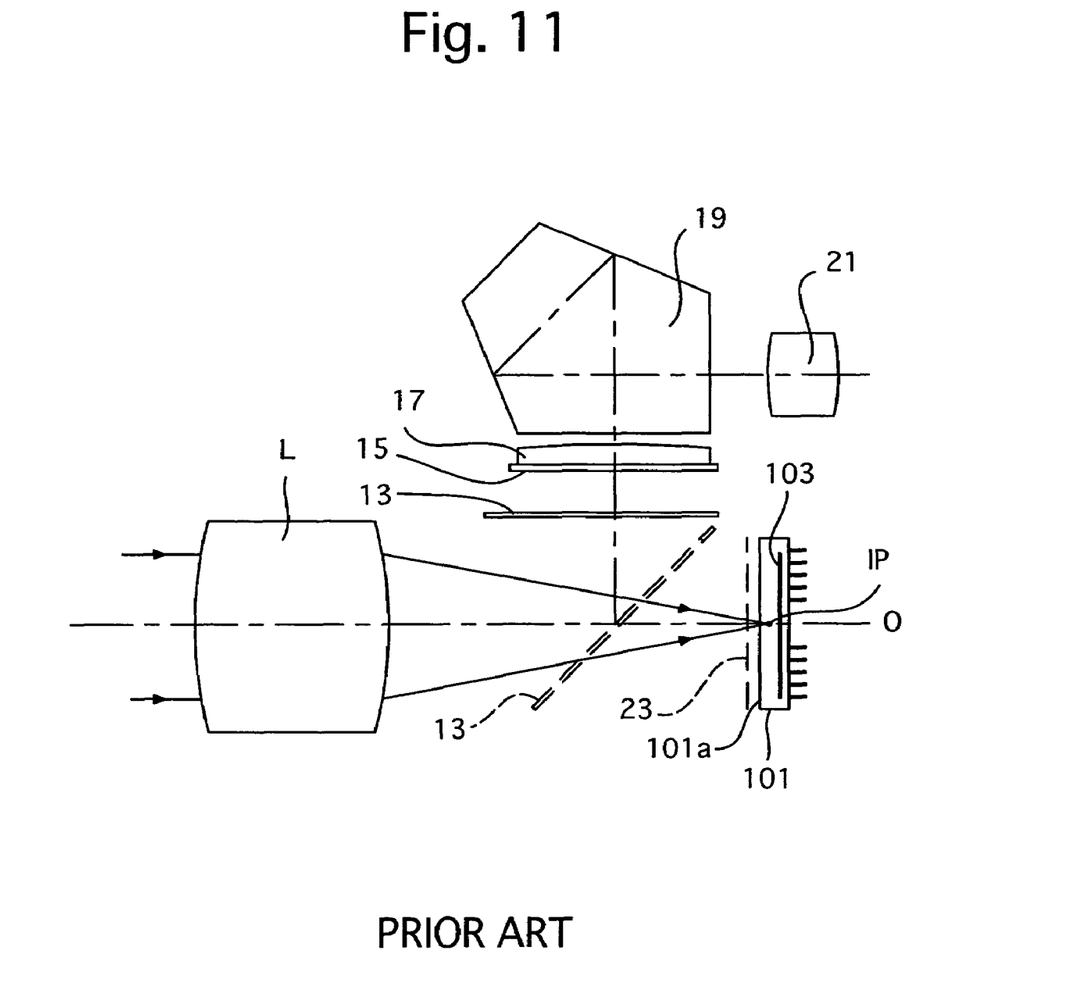
FIG. 11 is a diagram of fundamental optical elements of a conventional SLR electronic still camera.

In recent years, various types of electronic still cameras (e.g., SLR digital cameras) having camera bodies originally designed for conventional focal plane shutter cameras using silver-salt film (e.g., conventional SLR cameras) have been developed. FIG. 11 shows fundamental optical elements of a conventional SLR electronic still camera having a camera body (not shown) originally designed for a conventional SLR camera using silver-salt film. Light rays which are passed through a photographing lens L are reflected upward by a quick-return mirror 13 to pass through a focusing screen 15 which lies in a plane provided at a point optically equivalent to an image point (design image point) IP formed through the photographing lens L. Subsequently, the light rays which are passed through the focusing screen 15 are converged through a condenser lens 17, and are reflected by a pentagonal prism (image-erecting system) 19 to exit from an eyepiece 21. The user views the image focused on the focusing screen 15 as an erect image through the eyepiece 21, the pentagonal prism 19 and the condenser lens 17. Upon a shutter release operation, the quick-return mirror 13 comes up and a set of focal-plane shutter blades (shutter curtains) 23 of a focal plane shutter open so that an object image is formed on a plane (image plane including the image point IP) perpendicular to an optical axis 0. Accordingly, the object image which is identical to the object image focused on the focusing screen 15 and which has a focus state identical to that of the object image focused on the focusing screen 15 is formed on an image plane which passes the image point IP, and is captured by a CCD image sensor (image pick-up device) 101 positioned behind the set of focal-plane shutter blades 23.

The camera body of such a conventional SLR camera using silver-salt film is designed so that the image point IP is positioned on a film surface immediately behind the set of focal-plane shutter blades 23. Therefore, the spacing between the rear face of the set of focal-plane shutter blades 23 and the image point IP is very small.

The CCD image sensor 101 is provided with an imaging surface 103, and is further provided in front of the imaging surface 103 with various optical elements such as a cover glass, an optical low-pass filter and an infrared absorption filter. Due to this structure, the spacing between a frontmost surface 101a of the CCD image sensor 101 and the imaging surface 103 is large. Therefore, the CCD image sensor 101 interferes with the set of focal-plane shutter blades 23 if the CCD image sensor 101 is disposed so that the imaging surface 103 includes (coincides with) the image point IP, or the imaging surface 103 deviates from the image point IP if the CCD image sensor 101 is disposed not to interfere with the set of focal-plane shutter blades 23.

SUMMARY OF THE INVENTION

The present invention has been devised in view of the above described problems caused by an image pick-up device for an SLR still camera, and provides an electronic still camera which adopts a camera body of a conventional camera using silver-salt film and incorporating a focal plane shutter without adopting any special mechanical systems.

According to an aspect of the present invention, an electronic still camera is provided, including a photographing optical system, an image pick-up device, and a transmission optical component. Light rays of an object which are passed through the photographing optical system are incident on a sensor surface of the image pick-up device through the transmission optical component. The transmission optical component is shaped so as to shift an image point of an object image formed through the photographing optical system rearwards with respect to the photographing optical system.

The electronic still camera can include a focal plane shutter, and the transmission optical component and the image pick-up device can be positioned behind the focal plane shutter with respect to the photographing optical system.

It is desirable for the transmission optical component to include a concave surface having a negative optical power.

The surface on the photographing optical system side of the transmission optical component can include a concave lens surface.

The transmission optical component can be a concave lens having a concave surface on the sensor surface side.

It is desirable for the image pick-up device to include a protection glass on the photographing optical system side with respect to the sensor surface, and the transmission optical component which is installed on the photographing optical system side of the protection glass.

It is desirable for the transmission optical component to include an infrared absorption filter, an optical adhesive layer, and an optical low-pass filter, cemented in that order from the photographing optical system side. The surface on the photographing optical system side of the infrared absorption filter is a concave curved surface. The surface on the photographing optical system side of the optical adhesive layer includes a concave surface of a plano-concave lens.

It is desirable for the refractive index of the optical adhesive layer to be greater than the refractive index of the infrared absorption filter.

It is desirable for the transmission optical component to include an infrared absorption filter, an optical adhesive layer, and an optical low-pass filter, cemented in that order from the photographing optical system side. The infrared absorption filter has a plano-concave shape having a concave surface on the photographing optical system side.

It is desirable for the transmission optical component to include an infrared absorption filter, an optical adhesive layer, and an optical low-pass filter, cemented in that order from the photographing optical system side. The sensor surface side of the optical low-pass filter is a concave curved surface, and the optical adhesive layer has a plano-concave shape having a concave surface on the sensor surface side.

It is desirable for the refractive index of the optical adhesive layer to be greater than the refractive index of the low-pass filter.

It is desirable for the transmission optical component to include an infrared absorption filter, an optical adhesive layer and an optical low-pass filter, cemented in that order from the photographing optical system side, the infrared absorption filter and the optical low-pass filter being cemented together by the optical adhesive layer. The low-pass filter has a plano-concave shape having a concave surface on the sensor surface side.

It is desirable for the low-pass filter and the protection glass to be cemented to each other via the optical adhesive layer.

It is desirable for the low-pass filter and the protection glass to be cemented to each other at the peripheries thereof so as to define a predetermined amount of space therebetween.

It is desirable for the transmission optical component to be fixed to the image pick-up device with the space between the sensor surface and the photographing optical system being sealed in an air-tight manner.

It is desirable for the image pick-up device to include an infrared absorption filter, an optical adhesive layer, and an optical low-pass filter, in that order from the photographing optical system side. The surface on the photographing optical system side of the infrared absorption filter is a concave curved surface. The optical adhesive layer has a plano-concave shape having a concave surface on the infrared absorption filter side to which the optical adhesive layer is cemented.

It is desirable for the refractive index of the optical adhesive layer to be greater than the refractive index of the infrared absorption filter.

It is desirable for the transmission optical component to include an infrared absorption filter, an optical adhesive layer, and an optical low-pass filter, cemented in that order from the photographing optical system side. The infrared absorption filter has a plano-concave lens shape having a concave surface on the photographing optical system side.

It is desirable for the transmission optical component to include a transparent protection plate installed on the photographing optical system side of the sensor surface of the image pick-up device.

It is desirable for the transparent protection plate, which serves as the transmission optical component, to include a curved concave surface on the photographing optical system side; wherein a transparent liquid, having a refractive index which is greater than the transparent protection plate, is filled in between the transparent protection plate and the sensor surface.

It is desirable for the transparent protection plate to have a plano-concave shape having a concave surface on the photographing optical system side.

The present disclosure relates to subject matter contained in Japanese Patent Application No. 2002-282291 (filed on Sep. 27, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
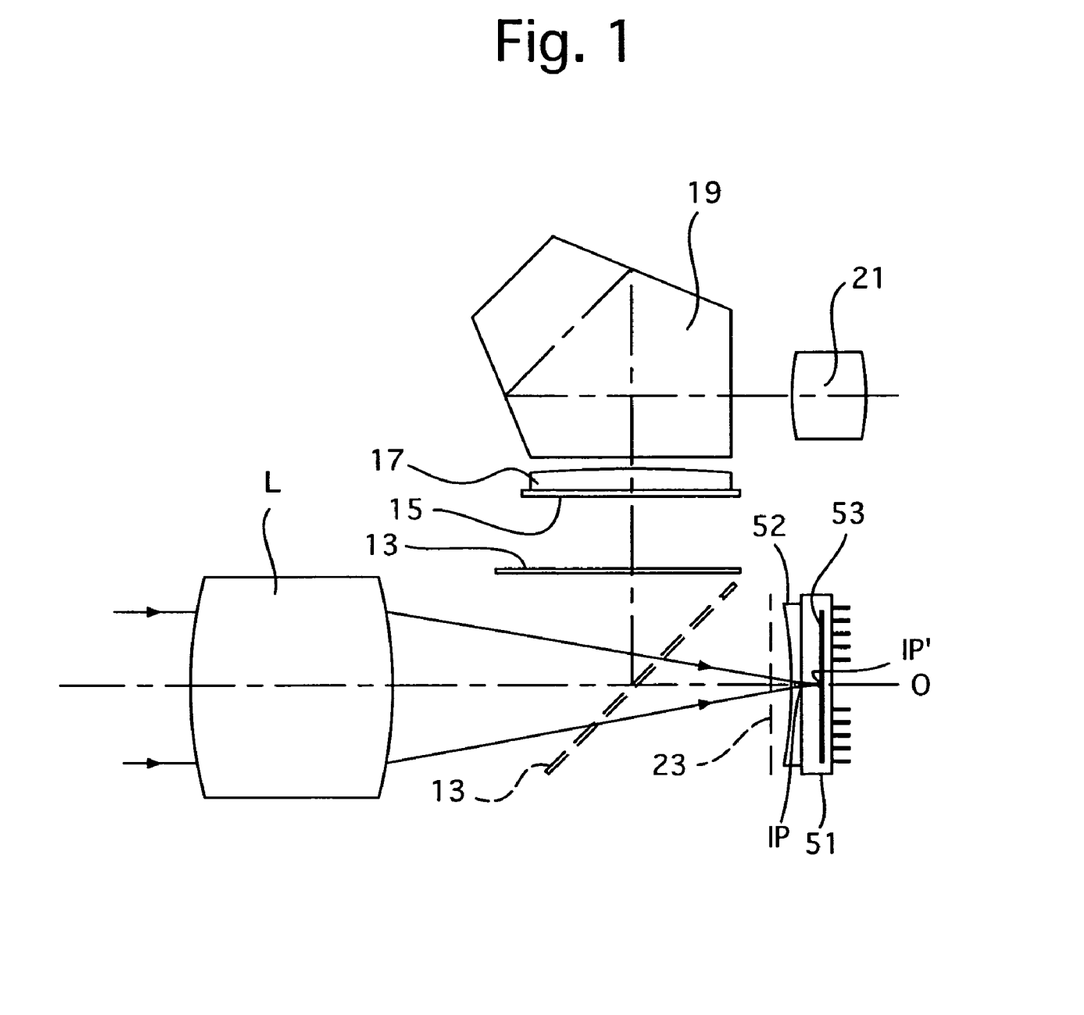
FIG. 1 is a diagram of fundamental optical elements of an embodiment of an SLR electronic still camera according to the present invention.
Figure 2:
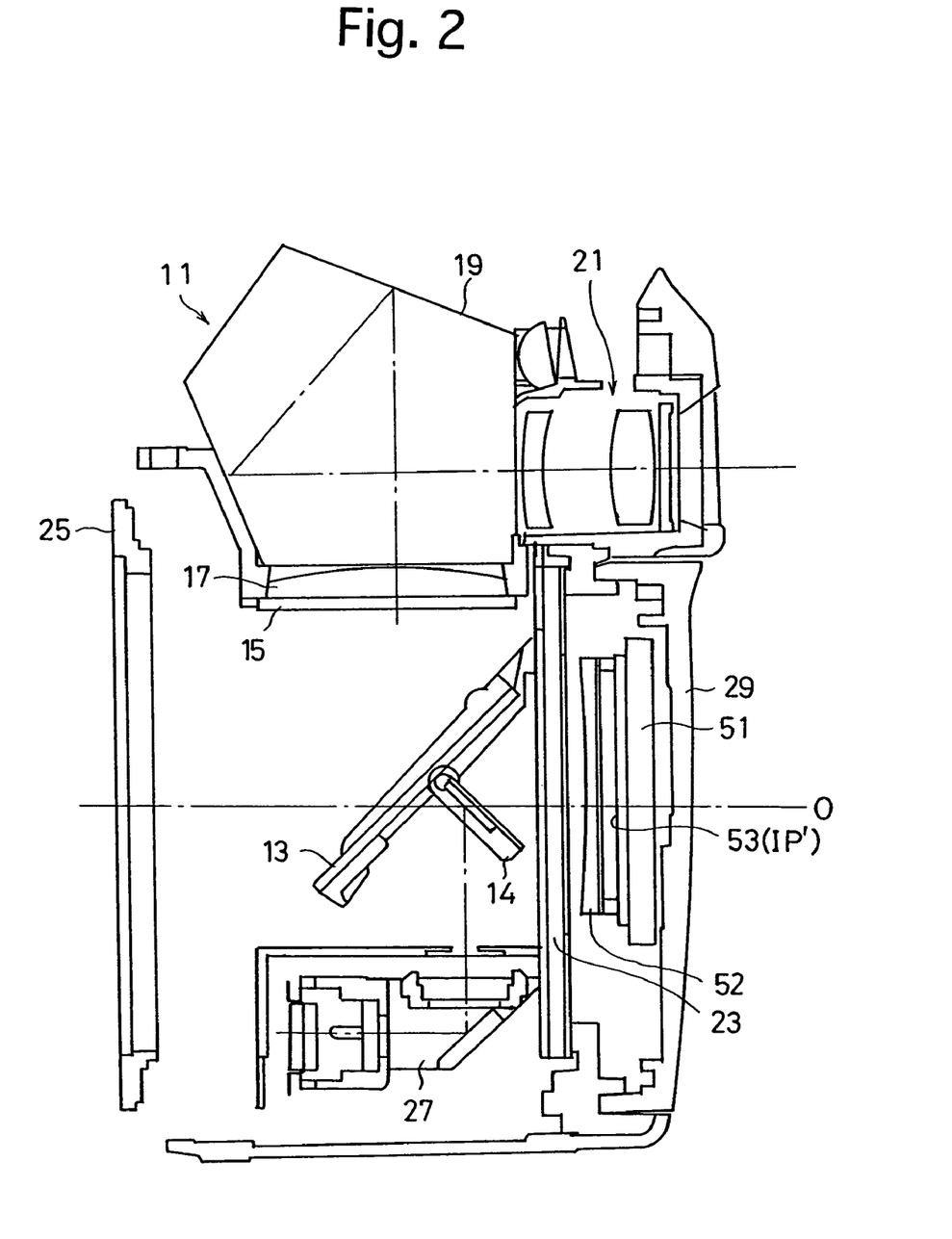
FIG. 2 is a longitudinal axial cross sectional view of the electronic still camera shown in FIG. 1.

FIG. 2 shows an embodiment of an SLR electronic still camera according to the present invention, and FIG. 1 shows fundamental optical elements of the SLR electronic still camera shown in FIG. 2.

The present embodiment of the SLR electronic still camera is provided with a camera body 11 which includes various mechanical and optical components which are originally designed for a conventional SLR camera using silver-salt film. The camera body 11 is provided therein with a quick-return mirror 13, a focusing screen 15, a condenser lens 17, a pentagonal prism 19 and an eyepiece 21 which are the same as those shown in FIG. 11. The light rays which are passed through a half mirror portion (not shown) formed on the quick-return mirror 13 are reflected downwards by a sub-mirror 14 (see FIG. 2) to be incident on an AF sensor unit 27. The AF sensor unit 27 is a conventional phase-difference detection AF sensor unit which detects an in-focus state from the pair of images respectively formed on a pair of line sensors by two light bundles which are respectively passed through two different pupil areas positioned at points optically equivalent to an image point IP (design image point). Each line sensor includes an array of photodiodes (array of light receiving elements), and each photodiode accumulates (integrates) an electric charge for a predetermined time in accordance with the brightness of the object image formed on the photodiode. The accumulated electric charges are read out of the photodiodes and converted into a video signal. This video signal is input to a CPU (MPU) provided in the camera body 11. The CPU determines a phase difference between the pair of object images respectively formed on the pair of line sensors, using an algorithm according to a phase difference detecting method known in the art, to calculate a defocus amount using the determined phase difference.

The camera body 11 is provided on the front thereof with a mount ring 25 to which an interchangeable lens barrel including a photographing lens L (see FIG. 1) is detachably attached, and is designed so that the image point IP is positioned immediately behind a set of focal-plane shutter blades 23 of a focal plane shutter.

The above described structure and the AF process of the camera body 11 are the same as those of a conventional SLR camera body using silver-salt film. Features of the present embodiment of the camera body will be discussed hereinafter. The camera body 11 is provided behind the set of focal-plane shutter blades 23 with an image pick-up device 51 (e.g., a CCD image sensor). The image pick-up device 51 is fixed to a rear body cover 29 or camera body 11 to be held at a predetermined position in the camera body 11. The position of the rear body cover 29 corresponds to the position of a back lid of a conventional SLR camera body using silver-salt film. Accordingly, the image pick-up device 51 is held in a space in the camera body 11 where a film pressure plate and film would be positioned if the camera body 11 is a conventional SLR camera body using silver-salt film.

The camera body 11 is provided immediately in front of the image pick-up device 51 with a lens block (correcting lens) 52 which is fixed to the image pick-up device 51. The lens block 52 is provided with a concave surface to have the effect of a concave lens. The image point (design image point) IP, which is determined by the SLR camera body 11 at the design stage, is shifted rearwards along an optical axis 0 by the concave lens effect of the concave surface to become a resultant image point IP' which is positioned on the imaging surface 53. Accordingly, the object image which is brought into focus via the AF sensor unit 27 is formed as an in-focus image on the imaging surface 53.

FIGS. 3 through 10 show first through eighth embodiments of the lens blocks 52 (52A through 52H) that are fixed to the image pick-up devices 51 (51A through 51H) having the imaging surfaces 53 (531 through 538), respectively. Each of FIGS. 3 through 10 is a longitudinal axial cross sectional view taken along a vertical plane including the optical axis 0, showing only fundamental optical elements of the lens block 52 and the image pick-up devices 51.

The image pick-up device 51 (51A through 51D) shown in FIGS. 3 through 6 is provided with a protection glass 59 (591 through 594) fixed thereto, which seals the imaging surface 53 (531 through 534) at the photographing lens L side (via which object light rays pass). Accordingly, in the first through fourth embodiments, the lens block 52 (52A through 52D) is attached to the outer surface (i.e., the surface on the photographing lens L side) of the protection glass 59 (591 through 594) to be integral therewith.

Figure 3:
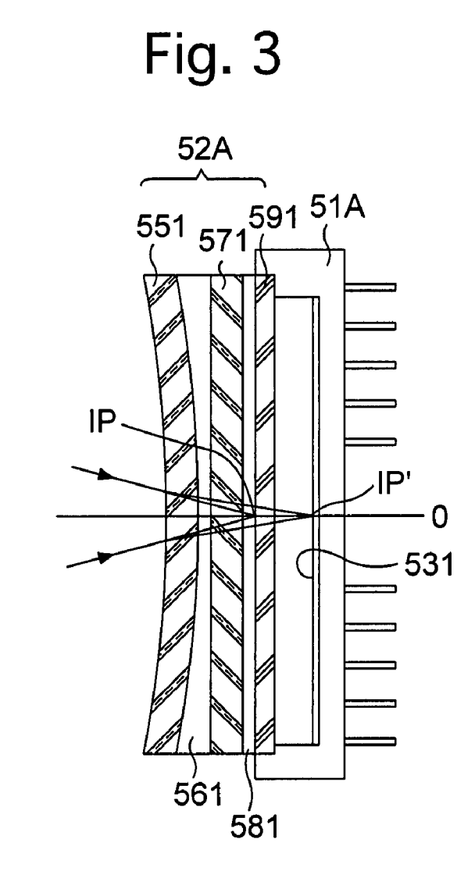
FIG. 3 is a longitudinal axial cross sectional view of a first embodiment of fundamental optical elements (which includes an image pick-up device) of the electronic still camera shown in FIGS. 1 and 2.
Figure 4:
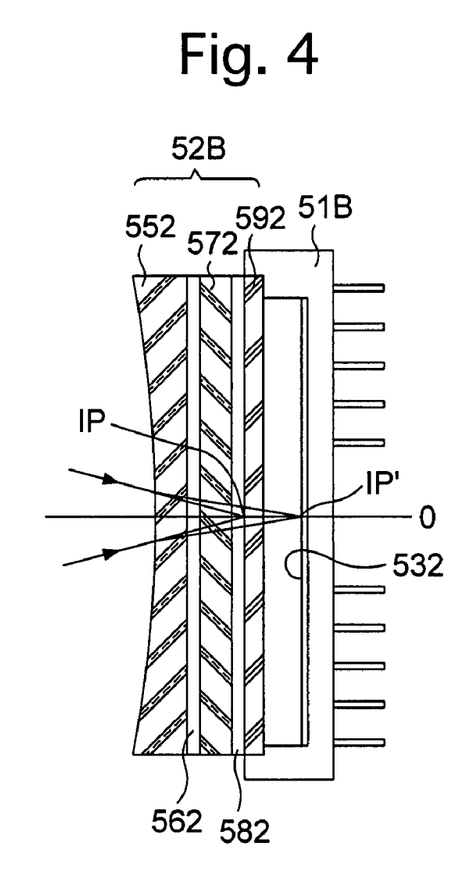
FIG. 4 is a longitudinal axial cross sectional view of a second embodiment of fundamental optical elements (which includes an image pick-up device) of the electronic still camera shown in FIGS. 1 and 2.

Each of the first and second embodiments shown in FIGS. 3 and 4 is characterized in that the frontmost surface of the lens block 52 is formed as the aforementioned concave surface of the lens block 52.

Embodiment 1

In the first embodiment shown in FIG. 3, the lens block 52A is provided with an infrared absorption filter 551, a front optical adhesive layer 561, an optical low-pass filter 571, a rear optical adhesive layer 581 and a transparent protection glass (transparent protection plate) 591, in that order from the photographing lens L side (i.e., from the object side).

The front surface and the rear surface of the infrared absorption filter 551 are a concave surface and a convex surface, respectively. Front and rear surfaces of the optical low-pass filter 571 are plane-parallel surfaces. The protection glass 591 is a plane-parallel plate. The rear surface (convex surface) of the infrared absorption filter 551 and the front surface of the optical low-pass filter 571 are cemented to each other by the front optical adhesive layer 561 with the infrared absorption filter 551 and the optical low-pass filter 571 being positioned apart from each other by a predetermined distance, while the rear surface of the optical low-pass filter 571 and the front surface of the protection glass 591 are cemented to each other by the rear optical adhesive layer 581.

In the first embodiment, the infrared absorption filter 551, the front optical adhesive layer 561, the optical low-pass filter 571, the rear optical adhesive layer 581 and the protection glass 591 are cemented together to form the lens block 52A, and functions as a plano-concave lens having a concave surface on the photographing lens L side, which in turn shifts the image point IP rearwards with respect to the photographing lens L to the resultant image point IP'.

In particular, in the first embodiment, the refractive index of the optical adhesive layer 561 is greater than that of the infrared absorption filter 551, therefore, the optical adhesive layer 561 also functions as a plano-concave lens, and can shift the image point IP to the resultant image point IP'.

Embodiment 2

In the second embodiment shown in FIG. 4, the lens block 52B (which is provided on the photographing lens L side of the imaging surface 532) includes an infrared absorption filter 552, a front optical adhesive layer 562, an optical low-pass filter 572, a rear optical adhesive layer 582 and a transparent protection glass 592, in that order from the photographing lens L side. The front surface and the rear surface of the infrared absorption filter 552 are a concave surface and a plane surface, respectively. Accordingly, the lens block 52B is formed as a plano-concave lens, the incident surface of which is formed as a concave surface. The rear surface of the infrared absorption filter 552 and the front surface of the optical low-pass filter 572 are cemented to each other by the front optical adhesive layer 562, while the rear surface of the optical low-pass filter 572 and the front surface of the protection glass 592 are cemented to each other by the rear optical adhesive layer 582. Accordingly, in the second embodiment shown in FIG. 4, the image point IP, which is determined by the SLR camera body 11 at the design stage, is shifted rearwards along the optical axis 0 to be the resultant image point IP' by the concave lens effect of the front surface (concave surface) of the infrared absorption filter 552.

In the second embodiment shown in FIG. 4, the infrared absorption filter 552, the front optical adhesive layer 562, the optical low-pass filter 572, the rear optical adhesive layer 582 and the protection glass 592 function as a plano-concave lens having a concave surface on the photographing lens L side, which in turn shifts the image point IP rearwards with respect to the photographing lens L to the resultant image point IP'.

Specifically, the incident surface of the infrared absorption filter 552, which is positioned farthest from the imaging surface (sensor surface) 532 among all the surfaces of the lens block 52B, is formed as a concave surface so that the lens block 52B functions as a concave lens. This makes it possible to increase the space between the image point IP and the resultant image point IP' (i.e., the amount of shift of the image point IP to the resultant image point IP'). Namely, the image point (IP) formed through the photographing lens L is shifted rearward by installation of the lens block 52B, which has the infrared absorption filter 552, the front optical adhesive layer 562, the optical low-pass filter 572, the rear optical adhesive layer 582 and the protection glass 592 in the second embodiment shown in FIG. 4.

Embodiment 3

Figure 5:
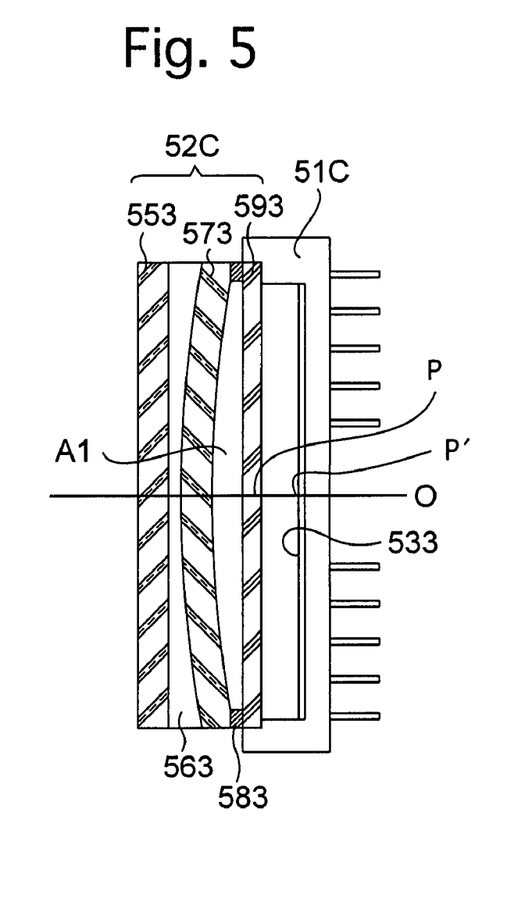
FIG. 5 is a longitudinal axial cross sectional view of a third embodiment of fundamental optical elements (which includes an image pick-up device) of the electronic still camera shown in FIGS. 1 and 2.

In the third embodiment shown in FIG. 5, in the lens block 52C, which is installed at the front surface of the image pick-up device 51C, the lens surface closest to a protection glass 593 is a concave surface.

The lens block 52C is provided with an infrared absorption filter 553, an optical adhesive layer 563, an optical low-pass filter 573 and the (transparent) protection glass 593 in this order from the side of the photographing lens L. The front and rear surfaces of the infrared absorption filter 553 are plane-parallel surfaces. The front surface and the rear surface of the optical low-pass filter 573 are a convex surface and a concave surface, respectively. The protection glass 593 is a plane-parallel plate. Space between the infrared absorption filter 553 and the optical low-pass filter 573 is filled with an optical adhesive to form the optical adhesive layer 563, whereas the outer edge of the rear surface of the optical low-pass filter 573 and the outer edge of the front surface of the protection glass 593 are cemented to each other by an optical adhesive 583 to form an air layer A1 between the optical low-pass filter 573 and the protection glass 593.

Accordingly, the lens block 52C is characterized in that a portion of the lens block 52C which includes the infrared absorption filter 553, the optical adhesive layer 563 and the optical low-pass filter 573 is formed as a plano-concave cemented lens, an exit surface of which is formed as a concave surface. Namely, a plano-concave lens is formed by the infrared absorption filter 553, the optical adhesive layer 563 and the optical low-pass filter 573.

In particular, in the third embodiment, the refractive index of the optical adhesive layer 563 is greater than that of the infrared absorption filter 553, therefore, the optical adhesive layer 563 also functions as a plano-concave lens, and can shift the image point IP to the resultant image point IP'

According to the third embodiment shown in FIG. 5, the light distribution does not have to be corrected since the infrared absorption filter 553 has a uniform transmittance.

Additionally, the lens block 52C and the image pick-up device 51C can be easily combined because the infrared absorption filter 553, the optical adhesive layer 563 and the optical low-pass filter 573 are formed as a single-piece member which is cemented to the protection glass 593 by the optical adhesive 583 which is positioned along the outer edge (peripheral edge) of the front surface of the protection glass 593. Namely, if the single-piece member which includes the infrared absorption filter 553, the optical adhesive layer 563 and the optical low-pass filter 573 is prepared in advance, the lens block 52C and the image pick-up device 51C can be easily combined simply by cementing the single-piece member to the protection glass 593.

Although cemented to the protection glass 593 by the optical adhesive 583 in the third embodiment shown in FIG. 5, the single-piece member which includes the infrared absorption filter 553, the optical adhesive layer 563 and the optical low-pass filter 573 can be fixed to the protection glass 593 by a leaf spring with a spacer positioned between the optical low-pass filter 573 and the protection glass 593, or the single-piece member and the optical low-pass filter 573 can be provided as separate members which are independently fixed to the protection glass 593.

Embodiment 4

Figure 6:
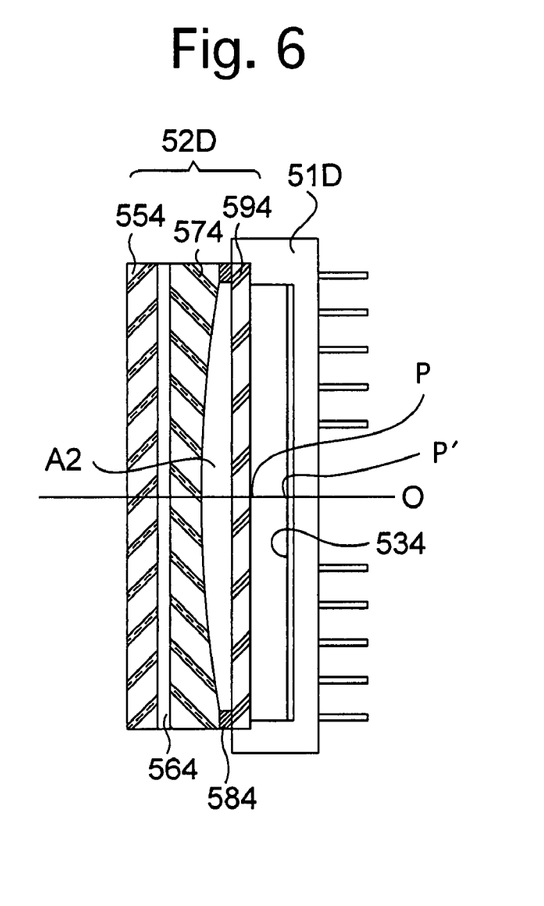
FIG. 6 is a longitudinal axial cross sectional view of a fourth embodiment of fundamental optical elements (which includes an image pick-up device) of the electronic still camera shown in FIGS. 1 and 2.

In the fourth embodiment shown in FIG. 6, the lens block 52D (which is provided on the photographing lens L side of the imaging surface 534) is provided with an infrared absorption filter 554, an optical adhesive layer 564, an optical low-pass filter 574 and a transparent protection glass 594, in that order from the photographing lens L side. The front and rear surfaces of the infrared absorption filter 554 are plane-parallel surfaces. The front surface and the rear surface of the optical low-pass filter 574 are a flat surface and a concave surface, respectively. The protection glass 594 is a plane-parallel plate. Space between the infrared absorption filter 554 and the optical low-pass filter 574 is filled with an optical adhesive to form the optical adhesive layer 564, whereas the outer edge of the rear surface of the optical low-pass filter 574 and the outer edge of the front surface of the protection glass 594 are cemented to each other by the optical adhesive 584 to form an air layer A2 between the optical low-pass filter 574 and the protection glass 594. Accordingly, the lens block 52D is characterized in that a portion of the lens block 52D which includes the infrared absorption filter 554, the optical adhesive layer 564 and the optical low-pass filter 574 is formed as a plano-concave cemented lens, an exit surface of which is formed as a concave surface. Namely, a plano-concave lens is formed by the infrared absorption filter 554, the optical adhesive layer 564 and the optical low-pass filter 574.

According to the fourth embodiment shown in FIG. 6, the light distribution does not have to be corrected since the infrared absorption filter 554 has an uniform transmittance.

Embodiment 5

Figure 7:
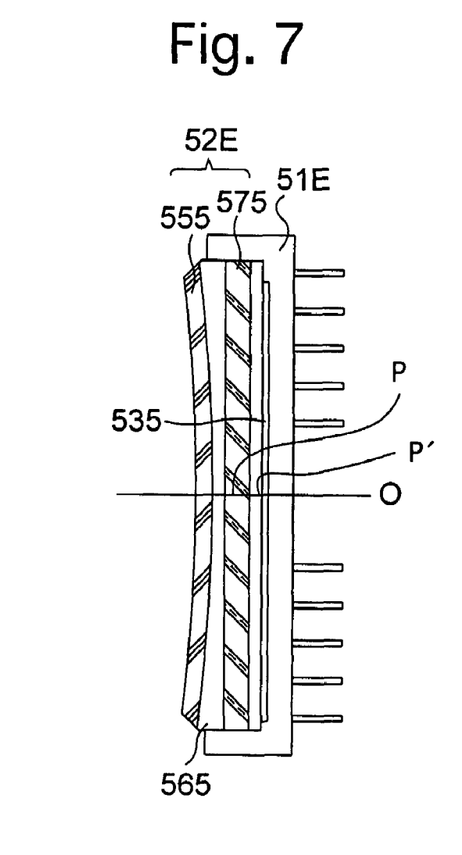
FIG. 7 is a longitudinal axial cross sectional view of a fifth embodiment of fundamental optical elements (which includes an image pick-up device) of the electronic still camera shown in FIGS. 1 and 2.

The fifth embodiment shown in FIG. 7 is substantially the same as the first embodiment shown in FIG. 3 except that the lens block 52E is not provided with a transparent protection glass corresponding to the protection glass 591 shown in FIG. 3 or an optical adhesive layer corresponding to the rear optical adhesive layer 581 shown in FIG. 3. In the fifth embodiment shown in FIG. 7, the lens block 52E is provided with an infrared absorption filter 555, an optical adhesive layer 565 and an optical low-pass filter 575 in that order from the side of the photographing lens L. The front surface and the rear surface of the infrared absorption filter 555 are a concave surface and a convex surface, respectively. Front and rear surfaces of the optical low-pass filter 575 are plane-parallel surfaces. Accordingly the lens block 52E which includes the infrared absorption filter 555, the optical adhesive layer 565 and the optical low-pass filter 575 is formed as a plano-concave cemented lens, an incident surface of which is formed as a concave surface. Namely, a plano-concave lens is formed by the infrared absorption filter 555, the optical adhesive layer 565 and the optical low-pass filter 575.

In the fifth embodiment, the infrared absorption filter 555, the front optical adhesive layer 565 and the optical low-pass filter 575 are cemented together to form the lens block 52E, and functions as a plano-concave lens having a concave surface on the photographing lens L side, which in turn shifts the image point IP rearwards with respect to the photographing lens L to the resultant image point IP'.

In particular, in the fifth embodiment, the refractive index of the optical adhesive layer 565 is greater than that of the infrared absorption filter 555, therefore, the optical adhesive layer 565 also functions as a plano-concave lens, and can shift the image point IP to the resultant image point IP'.

Embodiment 6

Figure 8:
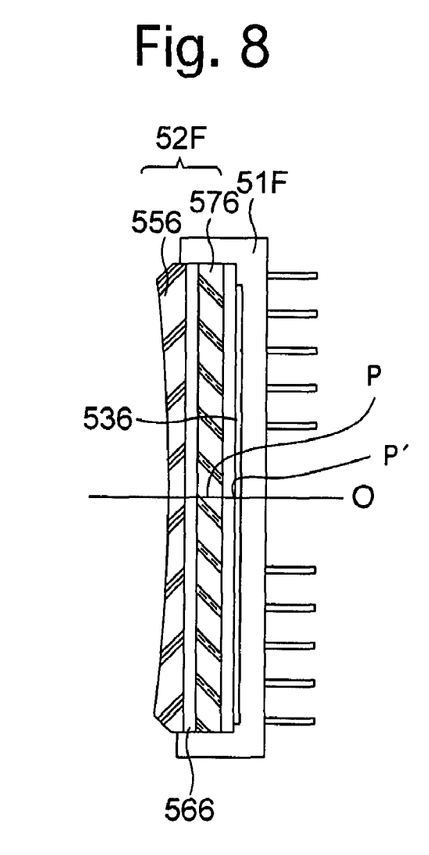
FIG. 8 is a longitudinal axial cross sectional view of a sixth embodiment of fundamental optical elements (which includes an image pick-up device) of the electronic still camera shown in FIGS. 1 and 2.

The sixth embodiment shown in FIG. 8 is substantially the same as the second embodiment shown in FIG. 4 except that the lens block 52F is not provided with a transparent protection glass corresponding to the protection glass 592 shown in FIG. 4 or an optical adhesive layer corresponding to the rear optical adhesive layer 582 shown in FIG. 4. In the sixth embodiment shown in FIG. 8, the lens block 52F is provided with an infrared absorption filter 556, an optical adhesive layer 566 and an optical low-pass filter 576 in that order from the side of the photographing lens L. The front surface and the rear surface of the infrared absorption filter 556 are a concave surface and a flat surface, respectively. Front and rear surfaces of the optical low-pass filter 576 are plane-parallel surfaces. Accordingly, the lens block 52F which includes the infrared absorption filter 556, the optical adhesive layer 566 and the optical low-pass filter 576 is formed as a plano-concave cemented lens, an incident surface of which is formed as a concave surface. Namely, a plano-concave lens is formed by the infrared absorption filter 556, the optical adhesive layer 566 and the optical low-pass filter 576.

In the sixth embodiment, the infrared absorption filter 556, the front optical adhesive layer 566 and the optical low-pass filter 576 are cemented together to form the lens block 52F, and functions as a plano-concave lens having a concave surface on the photographing lens L side, which in turn shifts the image point IP rearwards with respect to the photographing lens L to the resultant image point IP'.

In each of the fifth and sixth embodiments shown in FIGS. 7 and 8, the thickness of the lens block (52E or 52F) positioned in front of the imaging surface (535 or 536) is smaller than that of the lens block 52A shown in FIG. 3 or the lens block 52B shown in FIG. 4 since the lens block (52E or 52F) is provided with no glass cover corresponding to the glass cover (591 shown in FIG. 3 or 592 shown in FIG. 4). Therefore, the imaging surface (535 or 536) can be positioned closer to the set of focal-plane shutter blades 23.

Embodiment 7

Figure 9:
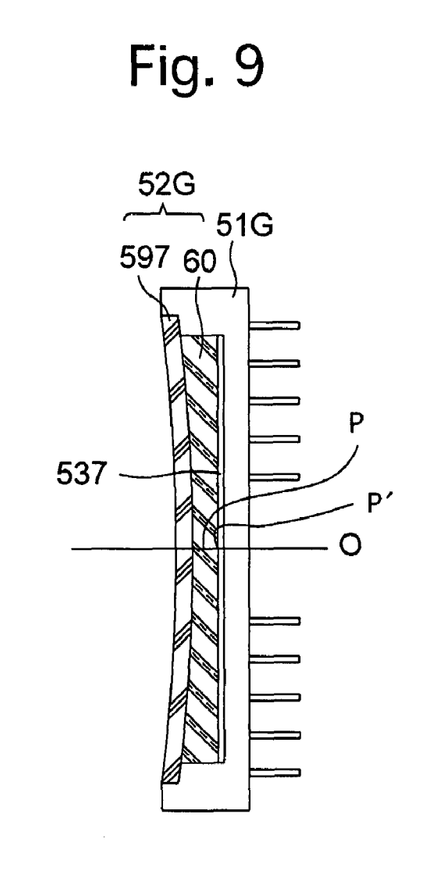
FIG. 9 is a longitudinal axial cross sectional view of a seventh embodiment of fundamental optical elements (which includes an image pick-up device) of the electronic still camera shown in FIGS. 1 and 2.

In the seventh embodiment shown in FIG. 9, the lens block 52G is provided with a transparent protection glass 597 and an optical adhesive layer 60, and is not provided with either an optical low-pass filter or an infrared absorption filter. The front surface (incident surface) and the rear surface (exit surface) of the protection glass 597 are a concave surface and a convex surface, respectively. Space between the protection glass 597 and an imaging surface (sensor surface) 537 of the image pick-up device 51G is filled with the optical adhesive layer 60 so that the protection glass 597 and the optical adhesive layer 60 constitute a concave lens, the exit surface of which is formed as a flat surface.

In particular, in the seventh embodiment, the refractive index of the optical adhesive layer 60 is greater than that of the protection glass 597, therefore, the optical adhesive layer 60 also functions as a plano-concave lens, and can shift the image point IP to the resultant image point IP'.

Embodiment 8

Figure 10:
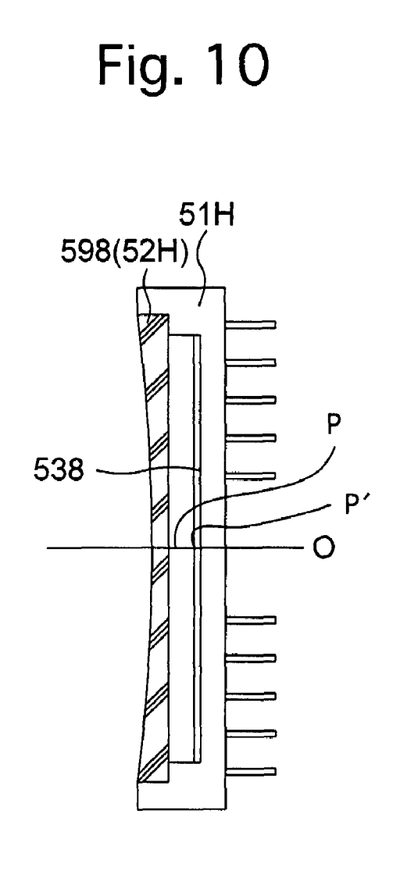
FIG. 10 is a longitudinal axial cross sectional view of an eighth embodiment of fundamental optical elements (which includes an image pick-up device) of the electronic still camera shown in FIGS. 1 and 2.

In the eighth embodiment shown in FIG. 10, the lens block 52H consists of only a transparent protection glass 598, and is not provided with either an optical low-pass filter or an infrared absorption filter. The front surface (incident surface) and the rear surface (exit surface) of the protection glass 598 are a concave surface and a flat surface, respectively. Space between the protection glass 598 and an imaging surface (sensor surface) 538 of the image pick-up device 51H is not filled with an optical adhesive layer such as the optical adhesive layer 60 of FIG. 9.

In the eighth embodiment, the protection glass 598 also functions as a plano-concave lens, and can shift the image point IP to the resultant image point IP'.

In each of the seventh and eighth embodiments shown in FIGS. 9 and 10, the amount of shifting the image point IP to the resultant image point IP' is small since the distance between the incident surface of the protection glass (597 or 598) and the imaging surface (537 or 538) is smaller than those in the above described first through sixth embodiments. However, according to each of the seventh and eighth embodiments shown in FIGS. 9 and 10, there is a greater degree of freedom in the placement of an optical low-pass filter and an infrared absorption filter in the camera body 11 since the optical low-pass filter and the infrared absorption filter can be provided independently of the lens block (52G or 52H).

As can be understood from the above descriptions, according to the present invention, the image point IP, which is determined at the design stage, can be shifted rearwards to be positioned on the imaging surface of an image pick-up device by a transmission optical component (the lens block 52A 52B, 52C, 52D, 52E, 52F, 52G or 52H) which is positioned in front of the imaging surface between the imaging surface and the photographing lens L to serve as a concave lens. Accordingly, a camera body of a conventional camera using silver-salt film and incorporating a focal plane shutter can be used as a camera body of an SLR still camera by incorporating an image pick-up device (having an imaging surface on which the image can be formed) into the camera body without altering the optical elements incorporated in the camera body of the conventional camera using silver-salt film.

Although the lens block is formed to serve as a plano-concave lens in each of the above described first through eighth embodiments, the lens block can be formed as a concavo-convex lens or a meniscus lens. The concave surface can be either a spherical surface or an aspherical surface (rotationally symmetric aspherical surface).

Although only one concave surface which serves as a concave lens is included in the lens block (52A, 52B, 52C, 52D, 52D, 52F, 52G or 52H) in each of the above described first through eighth embodiments, more than one surface of one or more than one optical elements of the lens block can be formed as concave surface. Whatever the shape of each optical element of the lens block may be, the lens block only needs to be formed to serve as a concave lens as a whole. In each of the above described first through eighth embodiments except for the seventh embodiment shown in FIG. 9, the enclosed space immediately in front of the imaging surface of the image pick-up device is filled with a special transparent gas or liquid serving as an antioxidant.

As can be understood from the foregoing, according to the present invention, the image point, which is formed through a photographing lens for forming an object image on the imaging surface of an image pick-up device, can be shifted rearwards by positioning a transmission optical component which functions as a concave lens in front of the imaging surface of the image pick-up device. Accordingly, even if the image point which is determined at the design stage is positioned immediately behind the focal plane shutter, the image point can be shifted rearwards to be positioned on the imaging surface of the image pick-up device so that an in-focus image can be captured by the image pick-up device.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic still camera comprising:
   a photographing optical system;
   an image pick-up device; and
   a transmission optical component;

wherein light rays of an object which are passed through said photographing optical system are incident on a sensor surface of said image pick-up device through said transmission optical component, wherein said transmission optical component is shaped so as to shift an image point of an object image formed through said photographing optical system rearwards with respect to said photographing optical system, wherein said transmission optical component includes a concave lens surface having a negative optical power, wherein said transmission optical component is fixed to said image pick-up device with the space between the sensor surface and the transmission optical system being sealed in an air-tight manner, wherein the surface on the photographing optical system side of said transmission optical component comprises a concave lens surface, wherein said image pick-up device comprises:

a protection glass on the photographing optical system side with respect to said sensor surface; and said transmission optical component which is installed on the photographing optical system side of said protection glass, wherein said transmission optical component comprises an infrared absorption filter, an optical adhesive layer, and an optical low-pass filter, cemented in that order from said photographing optical system side;

wherein the surface on the photographing optical system side of said infrared absorption filter is a concave curved surface; and wherein the surface on the photographing optical system side of said optical adhesive layer includes a concave surface of a plano-concave lens.

2. The electronic still camera according to claim 1, wherein said electronic still camera comprises a focal plane shutter, and wherein said transmission optical component and said image pick-up device are positioned behind said focal plane shutter with respect to said photographing optical system.

3. The electronic still camera according to claim 1, wherein said transmission optical component comprises a concave lens having a concave surface on the sensor surface side.

4. The electronic still camera according to claim 1, wherein the refractive index of said optical adhesive layer is greater than the refractive index of said infrared absorption filter.

* * * * *